US009929779B2

United States Patent

(12) United States Patent
Hung et al.
(10) Patent No.: US 9,929,779 B2
(45) Date of Patent: Mar. 27, 2018

(54) POWER ADAPTIVE DUAL MODE CARD EMULATION SYSTEM FOR NFC AND RFID APPLICATION

(71) Applicant: Maxim Integrated Products, Inc., San Jose, CA (US)

(72) Inventors: Cheng-Hsien Hung, Dallas, TX (US); Shiau Chwun George Pwu, Frisco, TX (US); Thomas Michael Maguire, Plano, TX (US); Haiyu Huang, Dallas, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 15/352,972

(22) Filed: Nov. 16, 2016

(65) Prior Publication Data

US 2017/0155429 A1 Jun. 1, 2017

Related U.S. Application Data

(60) Provisional application No. 62/261,713, filed on Dec. 1, 2015.

(51) Int. Cl.

*H04B 5/00* (2006.01)
*H04W 4/00* (2018.01)
*H04W 52/52* (2009.01)

(52) U.S. Cl.

CPC .......... *H04B 5/0037* (2013.01); *H04W 4/008* (2013.01); *H04W 52/52* (2013.01)

(58) Field of Classification Search

CPC ..... H04B 5/0037; H04W 4/008; H04W 52/52
USPC ........................................................ 455/41.1
See application file for complete search history.

(56) References Cited

U.S. PATENT DOCUMENTS 6,462,647 B1 * 10/2002 Roz .................... G06K 19/0701 340/10.1
6,630,910 B2 * 10/2003 Forster .................... B60C 23/04 340/572.7
6,744,367 B1 * 6/2004 Forster .............. G06K 19/0675 310/313 R
6,847,912 B2 * 1/2005 Forster ............... G06K 19/0723 222/1
6,853,347 B2 * 2/2005 Forster .................... B60C 23/04 340/445
6,946,989 B2 * 9/2005 Vavik .................... G01S 13/767 342/42

(Continued)

*Primary Examiner* — Hai V Nguyen

(74) *Attorney, Agent, or Firm* — North Weber & Baugh LLP

(57) ABSTRACT

An adaptive dual mode card emulation system (in Card Emulation Mode or PICC design) within an NFC device is disclosed to solve the strong field power delivering issue and also achieve longer communication range. The NFC device may be a NFC tag or an electronic device (such as a smartphone) operated in a card emulation mode. The NFC device comprises an antenna used for wireless communication. The adaptive dual mode card emulation system comprises a passive load modulation (PLM) module, an active load modulation (ALM) module and an automatic power control (APC) module. The APC module couples to both the ALM and PLM modules and selectably enables the ALM or PLM module depending on the strength of received carrier signal sent from an NFC reader.

17 Claims, 6 Drawing Sheets

(56) References Cited

U.S. PATENT DOCUMENTS 7,088,248 B2 * 8/2006 Forster ................ G06K 7/0008 235/385
7,109,867 B2 * 9/2006 Forster ............ G06K 19/07749 340/572.3
7,154,283 B1 * 12/2006 Weakley ............... G01R 29/08 324/756.01
7,239,287 B2 * 7/2007 Forster ............... B60C 23/0433 343/702
7,786,868 B2 * 8/2010 Forster .............. G06K 19/0723 340/572.1
7,929,910 B2 * 4/2011 Chen ....................... H04B 5/02 455/343.1
8,068,784 B2 * 11/2011 Takayama ............ H04L 63/045 380/270
8,384,523 B1 * 2/2013 Rodriquez .............. H04Q 9/00 340/10.1
8,385,825 B2 * 2/2013 Emura ................. H04W 24/00 455/41.1
8,410,906 B1 * 4/2013 Dacus ............... G06K 19/0701 340/10.1
8,421,598 B1 * 4/2013 Dacus ............... G06K 19/0701 340/10.1
8,436,714 B2 * 5/2013 Rodriguez .............. H04Q 9/00 340/10.1
8,531,273 B2 * 9/2013 Overhultz .......... G06K 7/10316 340/10.1
8,577,293 B2 * 11/2013 Takayama ............ H04L 63/045 380/270
8,581,704 B2 * 11/2013 van Niekerk ........ G06K 7/0008 340/10.3
8,686,887 B2 * 4/2014 Savoj ................ G06K 7/10237 340/10.1
8,760,261 B2 * 6/2014 Panchalan .......... G06K 7/10297 340/10.1
8,773,243 B1 * 7/2014 van Niekerk ........ G06K 7/0008 340/10.3
8,797,163 B2 * 8/2014 Finkenzeller ........ G06K 7/0008 340/10.1
8,810,373 B2 * 8/2014 Kim .................... H01Q 1/2225 340/10.34
8,816,819 B2 * 8/2014 Kim ....................... G06F 21/32 340/5.82
8,818,267 B2 * 8/2014 Savoj ................ G06K 7/10237 455/19
8,831,518 B2 * 9/2014 Hoeksel ............ G06Q 20/3226 455/41.1
8,952,788 B1 * 2/2015 Dacus ............... G06K 19/0701 340/10.1
9,014,323 B2 * 4/2015 Verlinden ............ H04L 7/0079 375/376
9,252,890 B2 * 2/2016 Liao ...................... H04B 15/00
9,367,711 B1 * 6/2016 Dacus ................. G06K 7/0008
9,486,138 B2 * 11/2016 Simpson ............. A61B 5/0002
9,544,853 B1 * 1/2017 Gu ................... H04W 52/0261
9,553,747 B2 * 1/2017 Ramakrishnan ........ H04L 27/04
9,577,718 B2 * 2/2017 Gaethke .............. H04B 5/0093
9,641,959 B2 * 5/2017 Brochu ................ H04W 4/008
2007/0206701 A1 * 9/2007 Paley .................. G06K 7/0008 375/295
2007/0206704 A1 * 9/2007 Zhou ................... G06K 7/0008 375/316
2007/0206705 A1 * 9/2007 Stewart ............... G06K 7/0008 375/316
2008/0020707 A1 * 1/2008 Takayama ............ H04L 63/045 455/41.2
2008/0032626 A1 * 2/2008 Chen ....................... H04B 5/02 455/41.1
2008/0238624 A1 * 10/2008 Safarian .............. H04B 5/0012 340/10.1
2009/0040022 A1 * 2/2009 Finkenzeller ........ G06K 7/0008 340/10.1
2009/0101716 A1 * 4/2009 Mani ................... G06K 7/0008 235/441
2010/0060425 A1 * 3/2010 Rodriguez .............. H04Q 9/00 340/10.1
2010/0060432 A1 * 3/2010 van Niekerk ........ G06K 7/0008 340/10.3
2010/0081376 A1 * 4/2010 Emura ................. H04W 24/00 455/41.1
2010/0198032 A1 * 8/2010 Simpson ............. A61B 5/0002 600/365
2010/0302009 A1 * 12/2010 Hoeksel ................ G01D 21/00 340/10.1
2011/0090065 A1 * 4/2011 Overhultz .......... G06K 7/10316 340/10.42
2011/0259953 A1 * 10/2011 Baarman .............. D06F 93/005 235/375
2011/0304439 A1 * 12/2011 Panchalan .......... G06K 7/10297 340/10.3
2012/0052806 A1 * 3/2012 Takayama ............ H04L 63/045 455/41.2
2012/0094603 A1 * 4/2012 Hoeksel ............ G06Q 20/3226 455/41.2
2013/0106634 A1 * 5/2013 Savoj ................ G06K 7/10237 341/144
2013/0201098 A1 * 8/2013 Schilit .................. H04L 12/282 345/156
2013/0203349 A1 * 8/2013 Hillan ..................... H04B 5/02 455/41.1
2013/0223250 A1 * 8/2013 Matsuo ............ H04W 74/0808 370/252
2013/0241705 A1 * 9/2013 Rodriguez .............. H04Q 9/00 340/10.1
2014/0120990 A1 * 5/2014 Parco ............... H04W 52/0229 455/574
2014/0170975 A1 * 6/2014 Liao ...................... H04B 15/00 455/41.1
2014/0342671 A1 * 11/2014 Kim ..................... H04W 4/008 455/41.3
2015/0063517 A1 * 3/2015 Verlinden ............ H04L 7/0079 375/376
2015/0310444 A1 * 10/2015 Chen ................. G06Q 20/4016 705/44
2015/0312839 A1 * 10/2015 Trehan ............... H04W 40/244 370/338
2015/0326545 A1 * 11/2015 Khan ................. H04L 63/0457 713/171
2015/0362928 A1 * 12/2015 Schmidlin .......... G05B 19/0426 700/276
2015/0378391 A1 * 12/2015 Huitema ................ G06F 1/163 361/679.03
2016/0072556 A1 * 3/2016 Lee ..................... H04B 5/0075 455/41.1
2016/0142113 A1 * 5/2016 Gaethke .............. H04B 5/0093 455/41.1
2016/0174267 A1 * 6/2016 Mofidi ................. H04W 76/02 455/41.1
2016/0182263 A1 * 6/2016 Ramakrishnan ........ H04L 27/04 375/300
2016/0321420 A1 * 11/2016 Klee .................... A61M 16/06
2017/0235341 A1 * 8/2017 Huitema .............. G06F 1/1652 361/679.03

* cited by examiner

POWER ADAPTIVE DUAL MODE CARD EMULATION SYSTEM FOR NFC AND RFID APPLICATION

CROSS REFERENCE TO RELATED APPLICATION

The application claims the benefit under 35 U.S.C. § 119(e) of Provisional Patent Application No. 62/261,713, entitled "POWER ADAPTIVE DUAL MODE CARD EMULATION SYSTEM FOR NFC AND RFID APPLICATION," naming as inventors Chen-Hsien Hung, Shiau Chwun George Pwu, Thomas Michael Maguire, and Haiyu Huang, and filed Dec. 1, 2015, the subject matter of which is hereby incorporated herein by reference in its entirety.

BACKGROUND

A. Technical Field

The present invention relates generally to Internet of Things (IOT), and more specifically to near field communication (NFC) and Radio Frequency Integrated Circuit (RFIC) communication.

B. Background of the Invention

The Internet of Things (IOT) is the network of physical objects or "things" embedded with electronics, software, sensors, and connectivity to enable objects to exchange data with the production, operator and/or other connected devices. IOT allows objects to be sensed and controlled remotely across existing network infrastructure, creating opportunities for more direct integration between the physical world and computer-based systems, and resulting in improved efficiency, accuracy and economic benefit.

In IOT applications, power amplifiers are widely used in transmitter (TX) circuit to generate the signal pulse from Card (Emulated) to increase the carrier amplitude to enhance the amplitude modulation received by reader receiver (RX), when TX delivers 1/0 signal.

In PICC and Card Emulation circuit, a Passive Load Modulation (PLM) scheme or an Active Load Modulation (ALM) scheme may be used for transmission. In PLM scheme, the coupled impedance loading the output stage of a reader or a proximity coupling devices (PCD) is variable to implement Amplitude Modulation (AM) to Reader. In ALM scheme, signal is transmitted (and synchronized with the carrier in the field) from tag/PICC device to mimic the behavior of passive load modulation (constructive/destructive interference to the reader) to extend the communication distance.

PLM has the advantage of protecting circuit from high power carrier input from a Reader or PCD by leaking out the most power with its regulator and limiter circuit when PICC is close to PCD (strong field). However, PLM becomes insufficient to deliver the signal when the communication distance is long. ALM can fulfill TX signal delivery at long distance by transmitting modulated signal to interfere PCD's carrier in the air (weak field). However, at short distance, the power delivered by ALM will be wasted by its protection circuit.

It would be desirable to have a scheme dealing with the power protection and signal delivery problems in card emulation mode or tag (PICC) design for near field communication (NFC) and Radio Frequency Integrated Circuit (RFIC) application.

SUMMARY OF THE INVENTION

Embodiments of the invention relate to a method using an adaptive dual mode card emulation system for NFC/RFIC application and method for its implementation.

In various embodiments, an adaptive dual mode card emulation system (in Card Emulation Mode or PICC design) within an NFC device is disclosed to solve the strong field power delivering issue and also achieve longer communication range. The NFC device may be a NFC tag or an electronic device (such as a smartphone) operated in a card emulation mode. The NFC device comprises an antenna used for wireless communication. Typically, the antenna may be used for both signal receiving and signal transmitting. The adaptive dual mode card emulation system comprises a passive load modulation (PLM) module, an active load modulation (ALM) module and an automatic power control (APC) module. The APC module couples to both the ALM and PLM modules and selectably enables the ALM or PLM module depending on the strength of received carrier signal sent from a reader.

In some embodiments, the APC module detects power level of the received carrier signal sent from a Reader (or a PCD) and selectably enables the ALM module or the PLM module along with different impedance/power setting to the antenna within the NFC device. The PLM module is selected when the received carrier signal has a signal strength above a predetermined threshold, and the ALM module is chosen when the received carrier signal has a signal strength below a predetermined threshold.

In some embodiments, a power amplifier (PA) is incorporated within the ALM module to deliver an amplified signal synchronized with the carrier signal to deliver message back to the Reader (PCD). The amplification level is adjustable according to the received power level detected by APC module.

In some embodiments, the adaptive dual mode card emulation system further comprises a voltage limiting module coupled between the antenna and the ALM/PLM module. The voltage limiting module is also coupled to the APC module to receive control signals from the APC module. The voltage limiting module has a triggering voltage which is used to enable the voltage limiting module to shunt the excessive voltage when the voltage across the antenna is above the triggering voltage. The triggering voltage may be a predetermined value or adjusted dynamically corresponding to the selection of ALM or PLM module. In some embodiments, when the ALM module is engaged, the triggering voltage is increased to allow signals with higher power to be transmitted out from the antenna.

In some embodiments, the APC module comprises a field detection block and a power control block. The field detection block couples to the antenna and sends a field detection result to the power control block. The power control block couples to the ALM module, PLM module and the voltage limiting module. Based at least on the field detection result, the power control block selectably enables to the ALM module or PLM module for desired operation mode.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are related to an adaptive dual mode card emulation system (in Card Emulation Mode or PICC design) within an NFC device. The NFC device may be a NFC tag or an electronic device (such as a smartphone) operated in a card emulation mode. The adaptive dual mode card emulation system comprises a passive load modulation (PLM) module, an active load modulation (ALM) module and an automatic power control (APC) module. The APC module couples to both the ALM and PLM modules and selectably enables the ALM or PLM module depending on the strength of received carrier signal sent from a reader.

Figure 1:
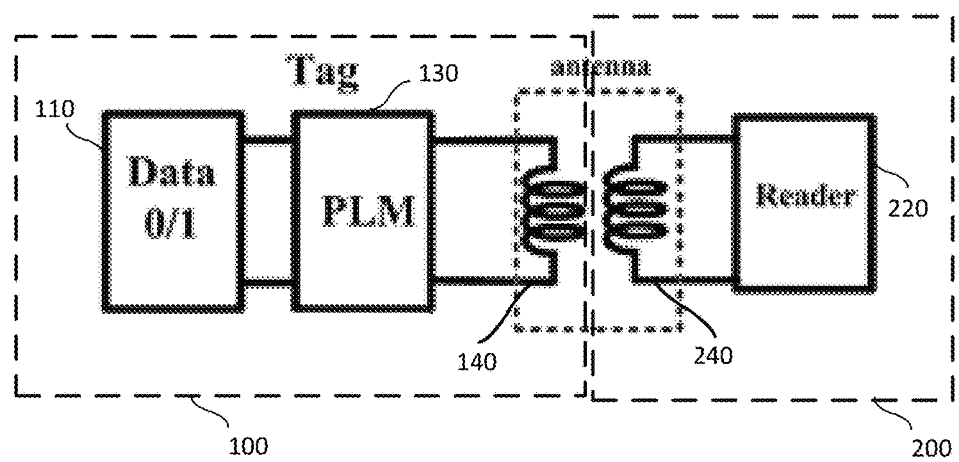
FIG. 1 is a schematic diagram showing coupling between an NFC tag with traditional Passive Load Modulation (PLM) and a reader.

FIG. 1 shows a schematic diagram showing coupling between an NFC tag (or a RFID tag) 100 with Passive Load Modulation (PLM) only and a NFC reader (or a PCD) 200. The NFC tag 100 comprises a digital baseband (DBB) 110, a PLM module 130 and a transmitter antenna 140. The reader 200 comprises a reader circuit 220 and a reader antenna 240. The NFC tag 100 and the reader 200 communicate with each other via coupling between the transmitter antenna 140 and the reader antenna 240. The transmitter (TX) 100 and the reader 200 are able to receive and transmit data at the same time. Thus, they may check for potential collisions if the received signal frequency does not match with the transmitted signal's frequency. The digital baseband 110 may incorporate a storage unit (e.g. a non-volatile memory) to store data such as transmitter identification information, Personal Identification Numbers, contacts, etc. Typically, the data are read only, but may also be rewriteable.

Figure 2:
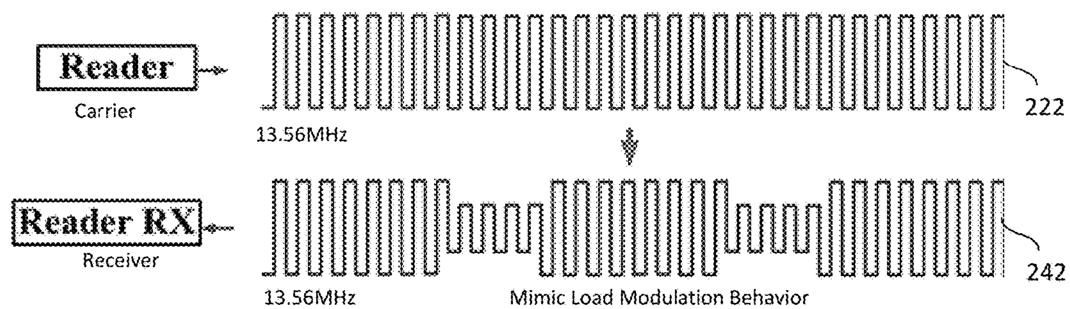
FIG. 2 is exemplary signal waveforms of a reader carrier signal and a reader received signal from an NFC tag using PLM modulation.

FIG. 2 shows exemplary signal waveforms of a reader carrier signal and a reader received signal from an NFC tag using PLM modulation. In operation, the reader 200 transmits a carrier signal 222 through the reader antenna 240. The carrier 222 is typically at a frequency of 13.56 MHz. The NFC tag 100 may be a passive transmitter drawing its operating power from the electromagnetic field of the carrier 222. The digital baseband 110 may also receive a recovery clock signal extracted from the carrier signal 222 to synchronize the NFC tag output and the carrier. The digital baseband 110 outputs a signal comprising binary bits, which is modulated by the PLM module 130. The PLM module 130 outputs a modulated signal 132, which is transmitted through the transmitter antenna 140 and received (shown as reader receiver signal 242) by the reader.

Figure 3:
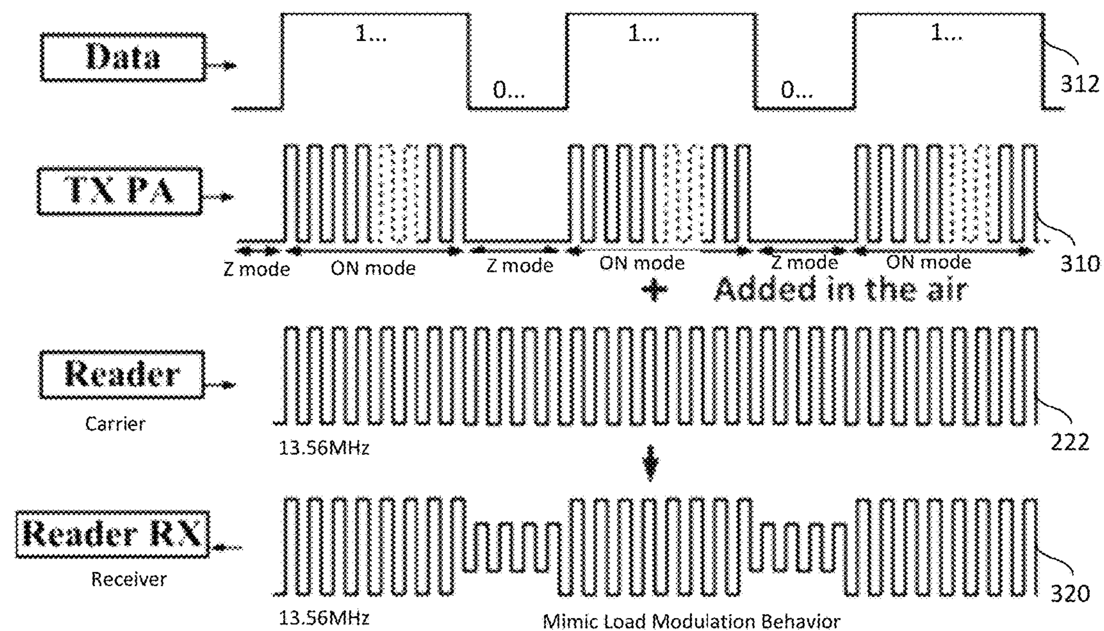
FIG. 3 is exemplary signal waveforms of a reader carrier signal and a reader received signal from an NFC tag using ALM modulation.

FIG. 3 is exemplary signal waveforms of a reader carrier signal and a reader received signal from an NFC tag using ALM modulation. In the scenario of ALM modulation, the NFC tag 100 is an active transmitter comprising a power amplifier with independent power source instead of drawing its operating power from the electromagnetic field of the carrier 222. In operation, the reader 200 transmits a carrier signal 222 through the reader antenna 240. The digital baseband 110 outputs a signal 312 comprising binary bits, which is amplified by a power amplifier. The power amplifier outputs an amplified signal 310, which is transmitted through the transmitter antenna 140. The reader receives a signal 320, which is a combination of the carrier signal 222 and the amplified signal 310 sent from the NFC tag.

Figure 4:
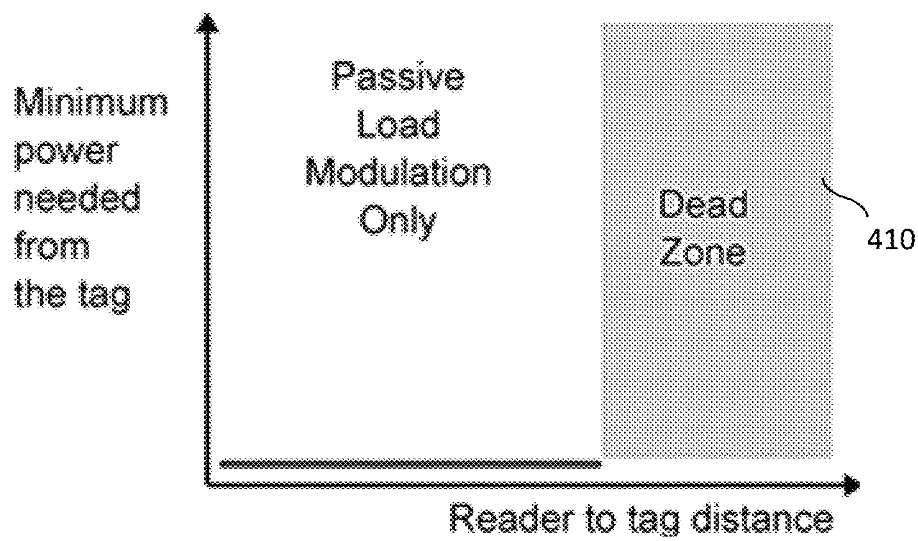
FIG. 4 is an exemplary diagram showing minimum power needed for the NFC tag with traditional Passive Load Modulation (PLM) only.

FIG. 4 is an exemplary diagram showing minimum power needed for the NFC tag with traditional Passive Load Modulation (PLM) only. A NFC tag with PLM modulation only has minimum power requirement when the NFC tag is close to the NFC reader. However, when the distance between the tag and the reader is large (beyond a distance threshold), the NFC tag may not extract enough power from the carrier signal from the reader and thus not be able to communicate. Therefore, there is a dead zone 410 for a NFC tag with PLM modulation only.

Figure 5:
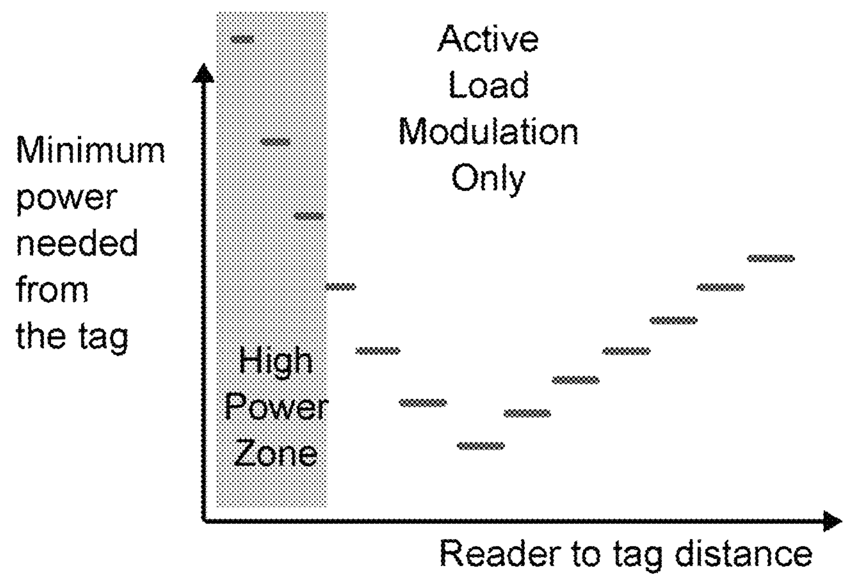
FIG. 5 is an exemplary diagram showing minimum power needed for the NFC tag with Active Load Modulation (ALM) only.

FIG. 5 is an exemplary diagram showing minimum power needed for the NFC tag with Active Load Modulation (ALM) only. NFC tag with ALM can fulfill TX signal delivery at long distance by transmitting modulated signal to a NFC reader. However, the power delivered by ALM is wasted at short distance when the NFC tag is at short distance away from the NFC reader.

Figure 6:
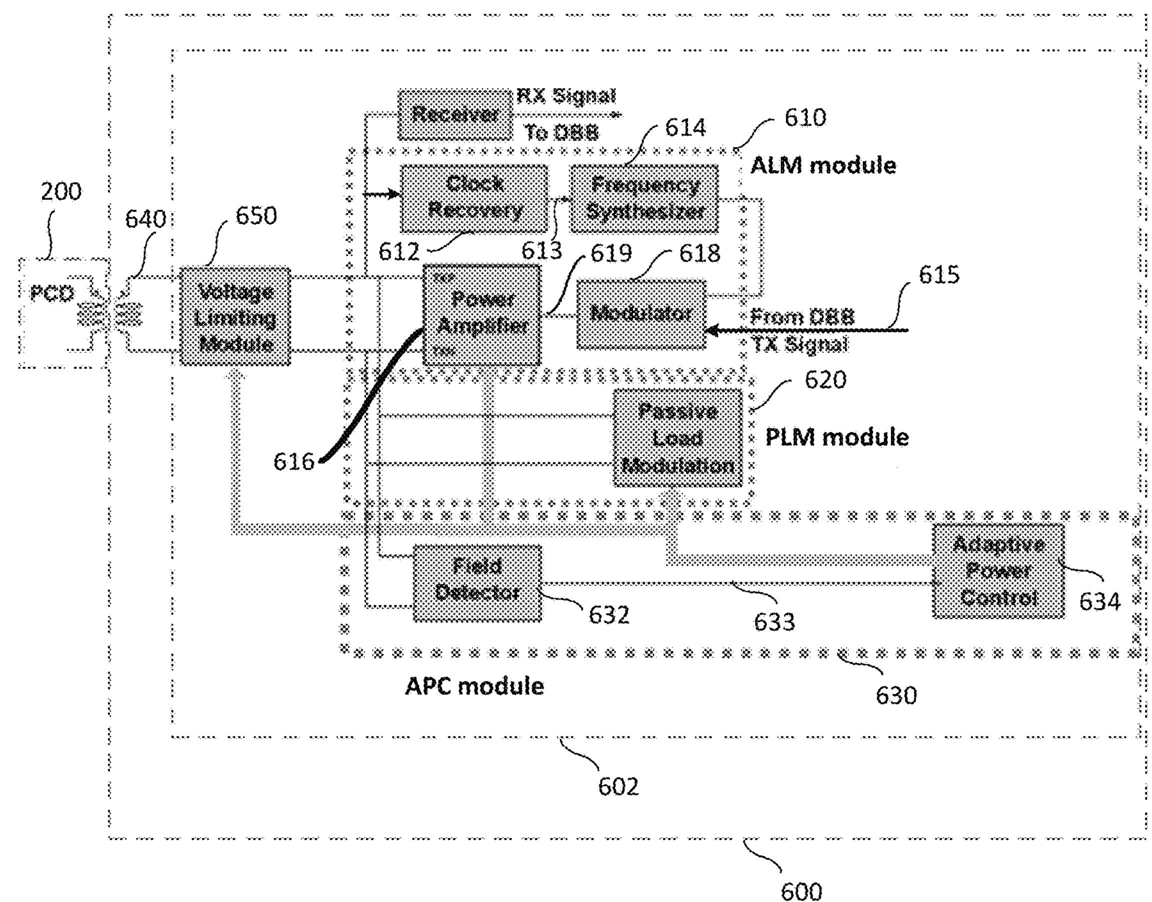
FIG. 6 is a schematic diagram of an NFC tag with adaptive power control system according to various embodiments of the invention.

FIG. 6 shows a schematic diagram of an NFC tag 600 with an adaptive power control system 602 according to various embodiments of the invention. In FIG. 6, the adaptive power control system 602 comprises an ALM module 610, a PLM module 620 and an adaptive power control (APC) module 630 coupled to both the ALM module 610 and the PLM module 620. The APC module 630 detects power level of carrier signal (sent from the Reader 200) received at a NFC antenna 640 and selectably enables the ALM module 610 or the PLM module 620 along with different impedance/power setting to the antenna 640. The PLM module 620 is selected when the received carrier signal has a signal strength above a predetermined threshold, and the ALM module 610 is chosen when the received carrier signal has a signal strength below a predetermined threshold.

In some embodiments, the adaptive dual mode card emulation system 602 further comprises a voltage limiting module 650 coupled between the antenna 640 and the ALM/PLM module. The voltage limiting module 650 is also coupled to the APC module 630 to receive control signals from the APC module. The voltage limiting module 650 has a triggering voltage which is used to enable the voltage limiting module to trim excessive voltage when the voltage across the antenna is above the triggering voltage. The triggering voltage may be a predetermined value or adjusted dynamically corresponding to the selection of ALM or PLM module. In some embodiments, when the ALM module is engaged, the triggering voltage is configured to be increased to allow signals with higher power to be transmitted out from the antenna to the reader 200.

In some embodiments, the ALM module 610 comprises a clock recovery block 612, a frequency synthesizer 614, a power amplifier (PA) 616 and a modulator 618. The clock recovery block 612 extracts a recovery clock signal 613 from the carrier and feeds the recovery clock signal 613 into the modulator 618 (via the frequency synthesizer 614). The modulator 618 also receives a TX signal 615 comprising binary bits from a digital baseband 110 (not shown in FIG. 6) and outputs a modulated signal 619, which passes through the power amplifier 130 for amplification, the voltage limiting module 650 and finally the transmitter antenna 140 for transmission.

In some embodiments, the APC module 630 comprises a field detection block 632 and a power control block 634. The field detection block 630 couples to the antenna 640 (directly or via the voltage limiting module 650) and sends a field detection result 633 to the power control block 634. The power control block 634 couples to the ALM module 610 (more specifically to the power amplifier 616), the PLM module 610 and the voltage limiting module 615. Based at least on the field detection result, the power control block selectably enables to the ALM module 610 or PLM module 620 for desired operation mode. In some embodiments, when the ALM module 610 is enabled, the triggering voltage of the voltage limiting module 615 is configured to be increased to allow signals with higher power to be transmitted out from the antenna to the reader 200.

Figure 7:
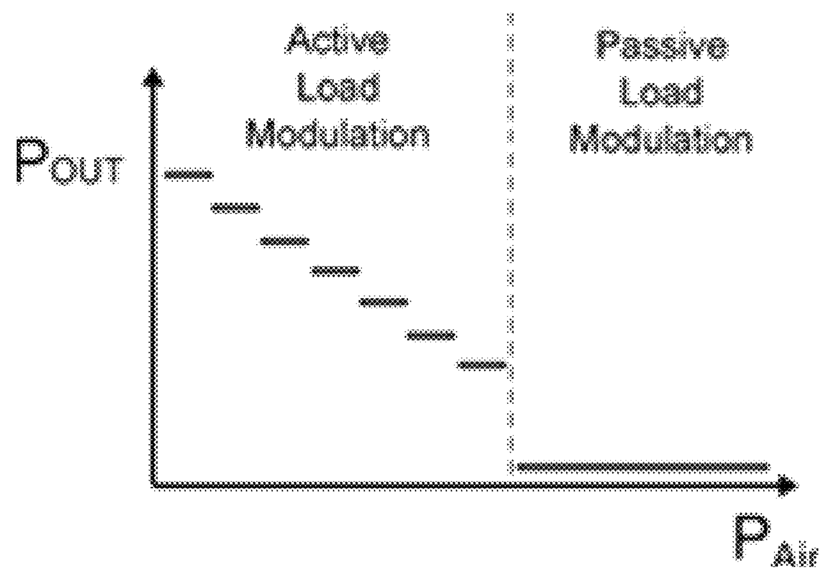
FIG. 7 is an exemplary diagram showing minimum power needed for the NFC tag with the adaptive power control system according to various embodiments of the invention.

FIG. 7 is an exemplary diagram showing minimum power needed for the NFC tag with the adaptive power control system according to various embodiments of the invention. As shown in FIG. 7, when the field detection result ($P_{AIR}$) is higher than a predetermined threshold, the PLM module is selected; when the received carrier signal ($P_{AIR}$) has a signal strength below a predetermined threshold, the ALM module 610 is enabled. More specifically, the power amplifier 616 is configured to enable the NFC tag transmit a signal with transmitting power decreased with increasing received carrier signal strength.

Figure 8:
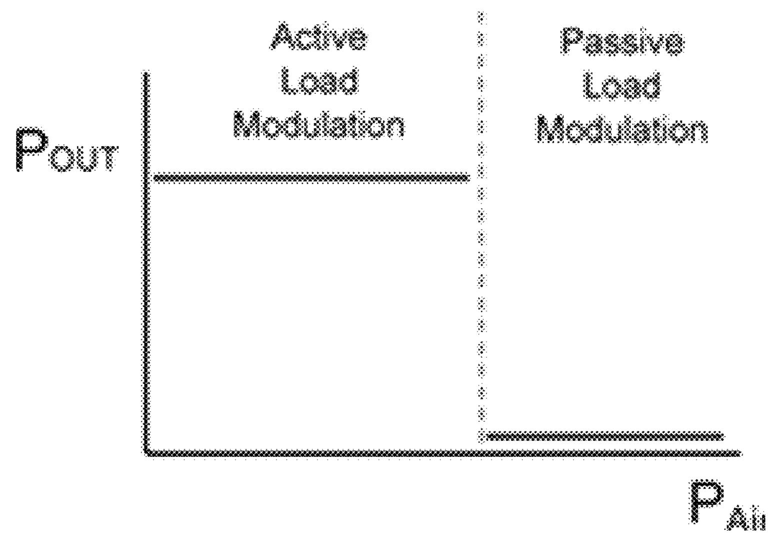
FIG. 8 is another exemplary diagram showing minimum power needed for the NFC tag with the adaptive power control system according to various embodiments of the invention.

FIG. 8 is another exemplary diagram showing minimum power needed for the NFC tag with the adaptive power control system according to various embodiments of the invention. When the field detection result ($P_{AIR}$) is higher than a predetermined threshold, the PLM module is selected; when the received carrier signal ($P_{AIR}$) has a signal strength below a predetermined threshold, the ALM module 610 is enabled. Furthermore, the power amplifier 616 is configured to enable the NFC tag transmit a signal with a constant transmitting power with ALM modulation.

Figure 9:
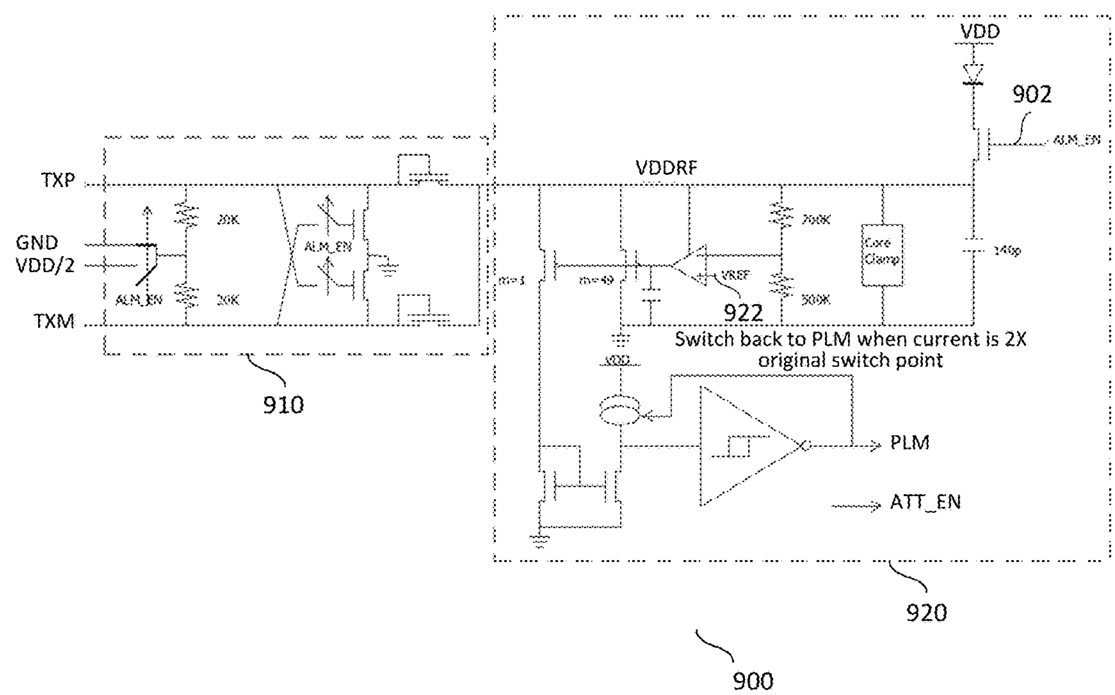
FIG. 9 is an exemplary diagram of a Voltage Limiting Module within the NFC tag with the adaptive power control system according to various embodiments of the invention.

FIG. 9 is an exemplary circuit diagram of a voltage limiting module within the adaptive power control system according to various embodiments of the invention. The voltage limiting module 900 couples to both the ALM module 610 and the PLM module 620. The default setup for adaptive power control system is PLM modulation. When the voltage limiting module 900 determines safe to switch to ALM modulation and the field detector 632 detects a carrier signal with signal strength below a predetermined threshold, the adaptive power control block 634 switches to ALM modulation by enabling the ALM module 610 and disenabling the PLM module 620. Once ALM has been enabled, the voltage limiting module 900, in combination of the field detector 632, also determines if and when it is necessary to switch back to PLM modulation.

In some embodiments, the voltage limiting module 900 comprises a rectifying stage 910 and a voltage regulation stage 920. The rectifying stage 910 couples to RF inputs TXP and TXM, which are also connected to the power amplifier 616 (not shown in FIG. 9) to rectify the RF input into a DC signal ($V_{DDRF}$). The voltage regulation stage 920 receives the DC signal and compares the DC signal to a triggering voltage (shown as $V_{REF}$ 922) for field variation determination and excessive voltage trimming. The triggering voltage may be predetermined or determined dynamically. Both the rectifying stage 910 and the voltage regulation stage 920 receive control signal 902 (ALM_EN) for operation control. For example, when the rectifying stage 910 receives the ALM_EN (ALM modulation enabling) signal, it couples both the RF inputs TXP and TXM to ground.

Although FIG. 9 is shown with the exemplary schematic diagram for the voltage limiting circuit, one skilled in the art will recognize that various modifications and embodiments of the voltage limiting module may be practiced. The modifications may include additional components such as additional filter in the rectifying stage, different signal processing sequence arrangements, etc.

The foregoing description of the invention has been described for purposes of clarity and understanding. It is not intended to limit the invention to the precise form disclosed. Various modifications may be possible within the scope and equivalence of the application.

The invention claimed is:

1. A near field communication device comprising:

an antenna to receive a carrier signal from a proximity coupling device;

a passive load modulation module;

an active load modulation module comprising a power amplifier to deliver an amplified output signal synchronized with the carrier signal back to the proximity coupling device, the amplified output signal has an amplification level adjustable according to the signal strength of the received carrier signal; and an automatic power control module coupling to the antenna, the active load modulation module, and the passive load modulation modules, the automatic power control module selectably enabling the active load modulation module or passive load modulation module depending on signal strength of the received carrier signal.

2. The near field communication device of claim 1 wherein the passive load modulation module is enabled when the signal strength is above a predetermined threshold, the active load modulation module is enabled when the signal strength is below the predetermined threshold.

3. The near field communication device of claim 1 wherein the proximity coupling device comprises a reader.

4. The near field communication device of claim 1 wherein the near field communication device further comprises a voltage limiting module coupled to the automatic power control module, the voltage limiting module being enabled to shunt excessive voltage when a voltage across the antenna is above a triggering voltage.

5. The near field communication device of claim 4 wherein the triggering voltage is adjustable corresponding to the selection of the active load modulation module or the passive load modulation module.

6. The near field communication device of claim 5 wherein when the active load modulation module is selected, the triggering voltage is increased to allow higher transmitting power from the antenna.

7. The near field communication device of claim 5 wherein the automatic power control module comprises a field detection block and a power control block, the field detection block coupling to the antenna and sending a field detection result to the power control block, the power control block selectably enabling the active load modulation module or passive load modulation module based at least on the field detection result.

8. A method for near field communication, the method comprising:

receiving, at an antenna within a near field communication device, a carrier signal from a proximity coupling device;

enabling a voltage limiting module to shunt excessive voltage when a voltage across the antenna is above a triggering voltage, the triggering voltage is adjustable corresponding to the selection of the active load modulation module or the passive load modulation module;

detecting a signal strength of the carrier signal; and selectably enabling an active load modulation module or a passive load modulation module within the near field communication device based at least on the detected signal strength.

9. The method of claim 8 wherein the passive load modulation module is enabled when the signal strength is above a predetermined threshold, the active load modulation module is enabled when the signal strength is below the predetermined threshold.

10. The method of claim 8 further comprising:

transmitting an amplified output signal synchronized with the carrier signal back to the proximity coupling device, if the active load modulation module is enabled.

11. The method of claim 10 wherein the amplified output signal is transmitted with a constant transmitting power.

12. The method of claim 10 wherein the amplified output signal has an amplification level adjustable according to the signal strength of the carrier signal.

13. The method of claim 10 wherein the amplified output signal is transmitted with transmitting power decreased with increasing received carrier signal strength.

14. A near field communication device comprising:

an antenna to receive a carrier signal from a reader;

an automatic power control module coupling to the antenna to detect signal strength of the received carrier signal;

a modulator receiving a transmitting signal comprising binary bits from a baseband and a recovery clock signal extracted from the received carrier signal, the modulator outputting a modulated signal based at least on the transmitting signal and the recovery clock signal;

a power amplifier to amplify the modulated signal for transmission from the antenna, the power amplifier being enabled when the detected signal strength is below a threshold; and a voltage limiting module coupled to the power amplifier and the automatic power control module, the voltage limiting module being enabled to trim excessive voltage when the amplified modulated signal is above a triggering voltage.

15. The near field communication device of claim 14 further comprises a passive load modulation module coupled to the automatic power control module, the passive load modulation being enabled when the detected signal strength is above the threshold.

16. The near field communication device of claim 14 wherein when the detected signal strength is below the threshold, the power amplifier is enabled with a constant transmission power.

17. The near field communication device of claim 14 wherein when the detected signal strength is below the threshold, the power amplifier is enabled with a transmission power decreased with increasing detected signal strength of the received carrier signal.

* * * * *